Jan. 5, 1943.  W. P. WINTERS  2,307,089
ELECTRIC WELDING CAN BODY
Filed Jan. 9, 1941  6 Sheets-Sheet 1
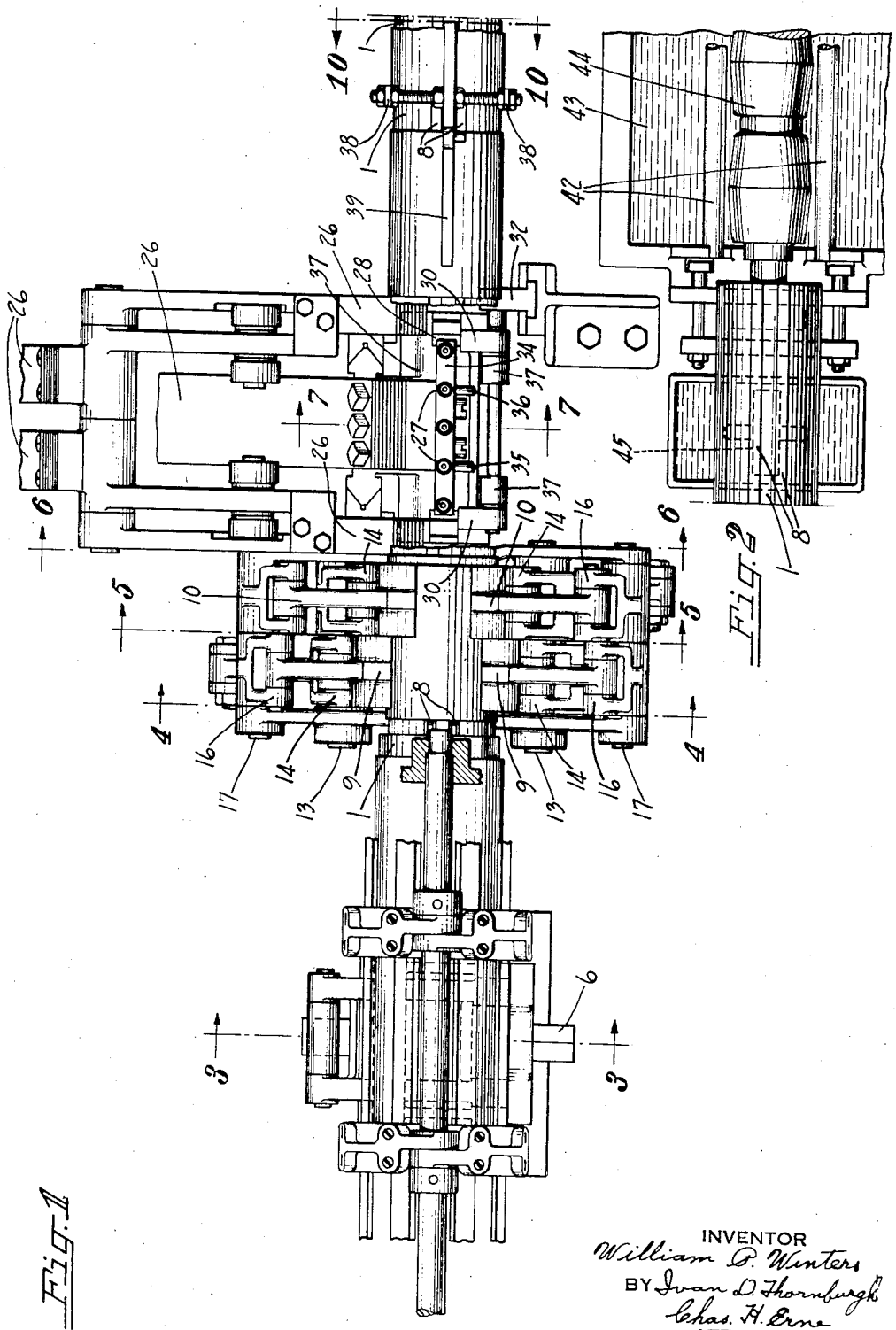
INVENTOR
William P. Winters
BY Ivan D. Thornburgh
Chas. H. Erne
ATTORNEYS Jan. 5, 1943.  W. P. WINTERS  2,307,089
ELECTRIC WELDING CAN BODY
Filed Jan. 9, 1941   6 Sheets-Sheet 2

INVENTOR
William P. Winters
BY Ivan O. Thornburgh
Chas. H. Erne
ATTORNEYS

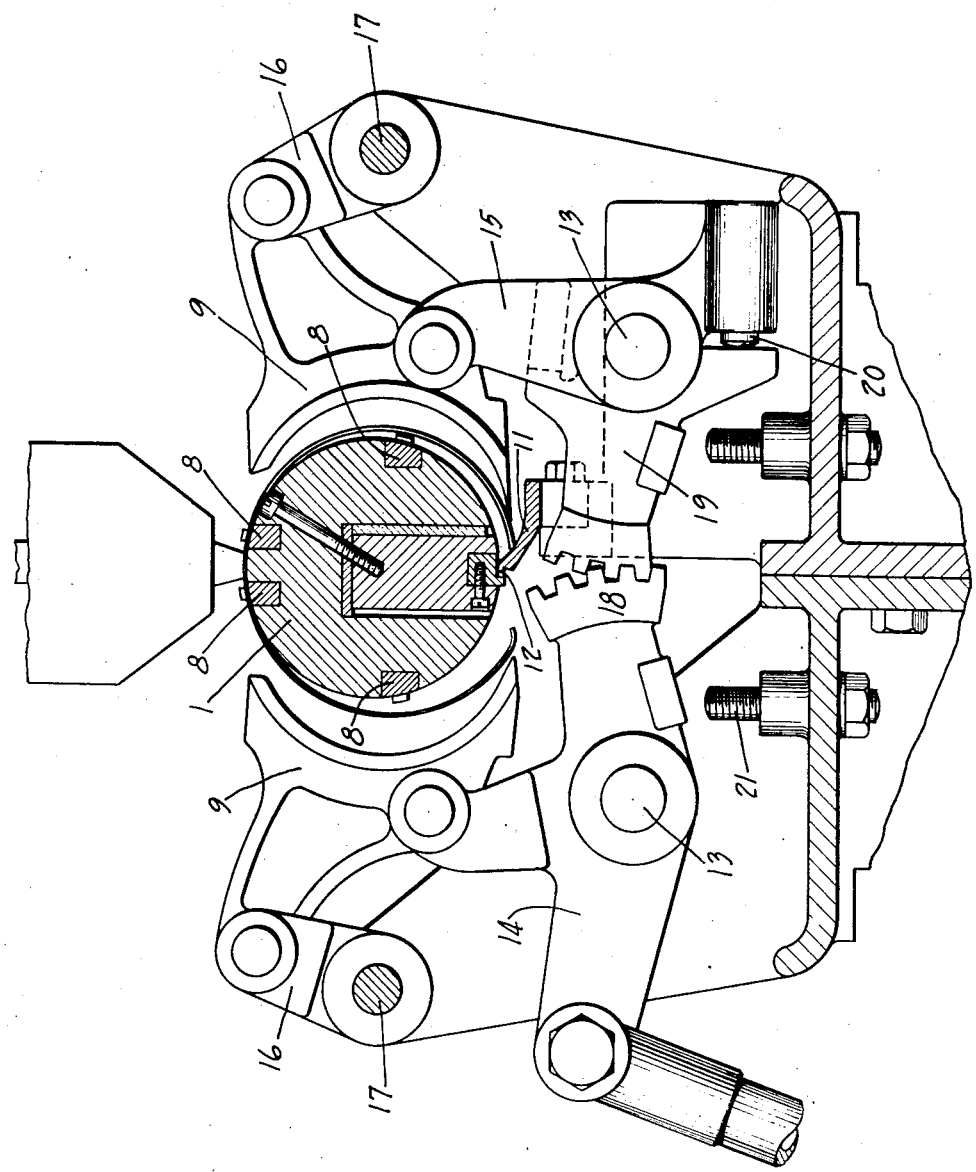

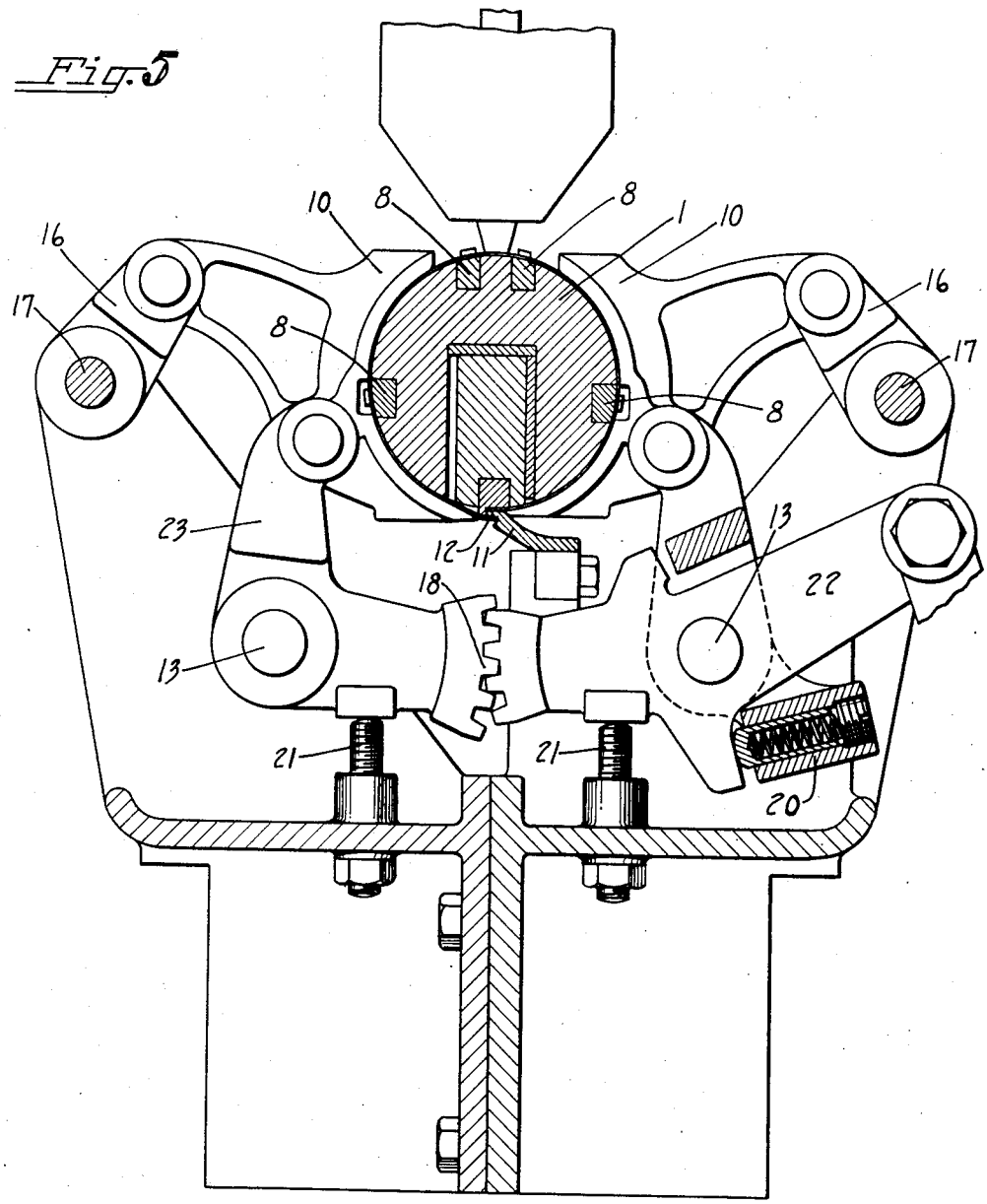

Jan. 5, 1943. W. P. WINTERS 2,307,089
ELECTRIC WELDING CAN BODY
Filed Jan. 9, 1941 6 Sheets-Sheet 5
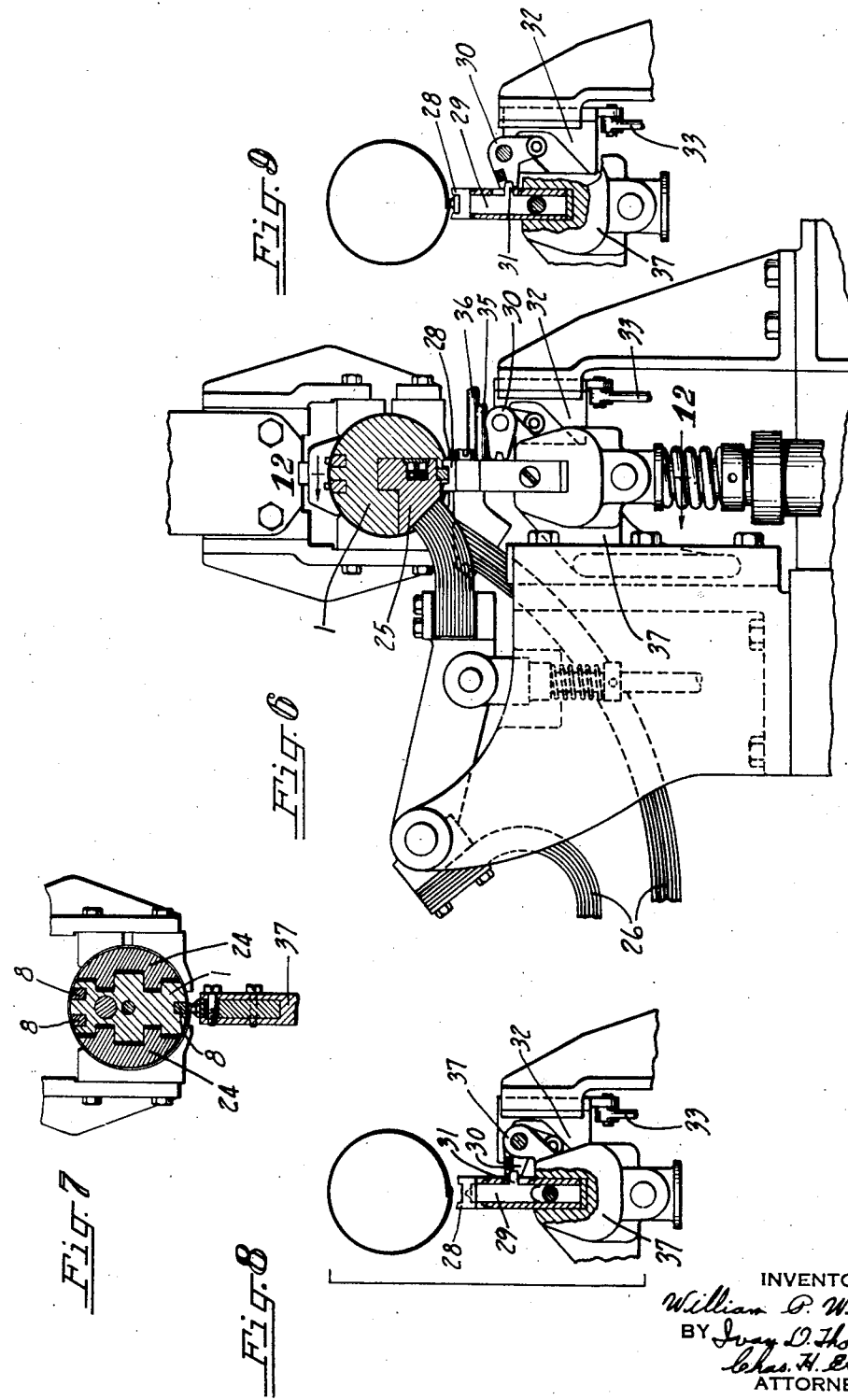

Jan. 5, 1943.   W. P. WINTERS   2,307,089
ELECTRIC WELDING CAN BODY
Filed Jan. 9, 1941   6 Sheets-Sheet 6
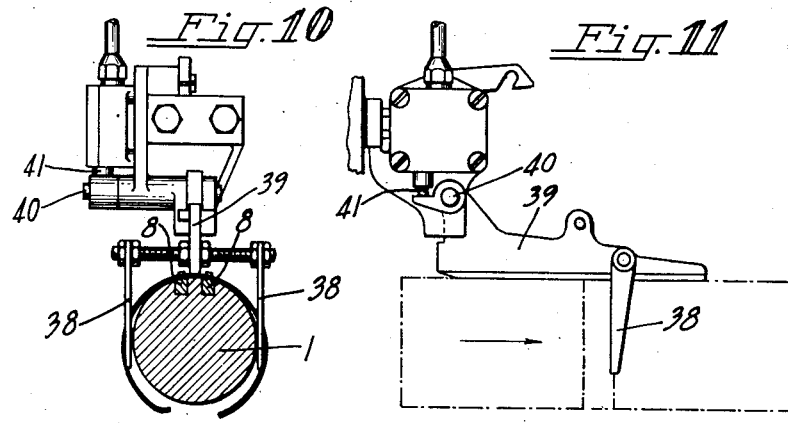
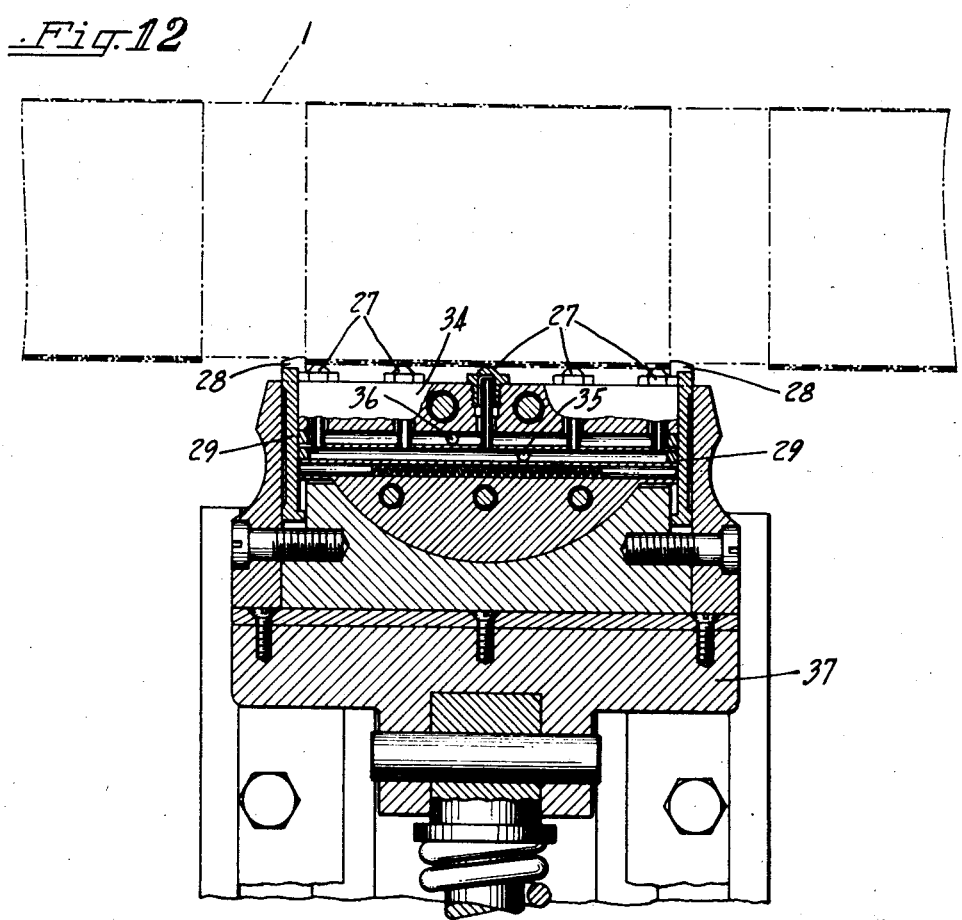
INVENTOR
William P. Winters
BY Ivan D. Thornburgh
Cahas H. Erne
ATTORNEYS Patented Jan. 5, 1943

2,307,089

UNITED STATES PATENT OFFICE 2,307,089

ELECTRIC WELDING CAN BODY

William P. Winters, Cincinnati, Ohio, assignor to American Can Company, New York, N. Y., a corporation of New Jersey Application January 9, 1941, Serial No. 373,845

11 Claims. (Cl. 219—6)

The invention relates to a machine for spot welding the joint in lap seam cans preparatory to or in combination with fluxing and soldering the side seams thereof. Partially formed can bodies are fed into one end of the machine with the seam edges disposed where they are engaged by suitable guides that hold the edges in proper location to contact with means engaging one edge to give it a slight inward bend so that it will lie tight against the surface of the other edge when the fully formed body is placed in position for welding. The body is then moved forward into a sizing form that sizes it from the outside through the medium of an expanding horn located inside of the sizing form, thus holding the body to an exact diameter during the welding operation, after which the spot welded body may be passed directly to a fluxing and soldering apparatus for application of solder to the welded side seam.

In some respects this invention may be considered an improvement on the J. Brenzinger United States Letters Patent 1,663,970, issued March 27, 1928.

An object of the invention is the provision of an apparatus that will positively size each can body from the outside by means of an expanding horn located inside of the sizing means so that all bodies so produced will have the same diameter, together with means for forming the side seam so that the sized bodies may keep their shape and size.

A further object of the invention resides in providing a circulating cooling medium for such an apparatus which contacts the spot welding dies and flows away to thereby provide a continuous flow of cooling medium during the welding operations.

Another object is to provide means for longitudinally aligning the edges of the formed bodies as they are placed in position on the sizing horn so that one edge will not project beyond the other edge after the welding operation.

Another feature of the invention provides detecting means for automatically stopping the machine if a body blank gets through the welding station without proper welding of the side seam and this prevents damaging the unwelded blank and prevents jamming the machine.

Numerous other objects and advantages of the invention will be apparent as it is better understood from the following description, which, taken in connection with the accompanying drawings, discloses a preferred embodiment thereof.

Referring to the drawings:

Figure 1 and Figure 2, which is a continuation of Figure 1, are plan views of a machine embodying the invention with some parts broken away to show structure underneath;

Figs. 3, 4 and 5 are greatly enlarged vertical cross sections taken substantially on the respective lines 3—3, 4—4 and 5—5 of Fig. 1 and looking in the direction of the arrows;

Figs. 6 and 7 are vertical cross sections taken substantially along the lines 6—6 and 7—7 of Fig. 1 and looking in the direction of the arrows;

Figs. 8 and 9 are details of the longitudinal aligning gauges which square up and align the ends of the seam edges as the formed bodies are positioned at the welding station;

Fig. 10 is a cross sectional view of the electrical detector for controlling the stopping of the machine when a body is passed along without being welded and is a view taken substantially on the line 10—10 of Fig. 1;

Fig. 11 is a side view of the mechanism of Fig. 10 showing the relative locations of the detector parts; and Fig. 12 is a cross sectional view on an enlarged scale as taken substantially along the broken line 12—12 of Fig. 6 and disclosing the circulating cooling system for the welding die.

Figure 3:
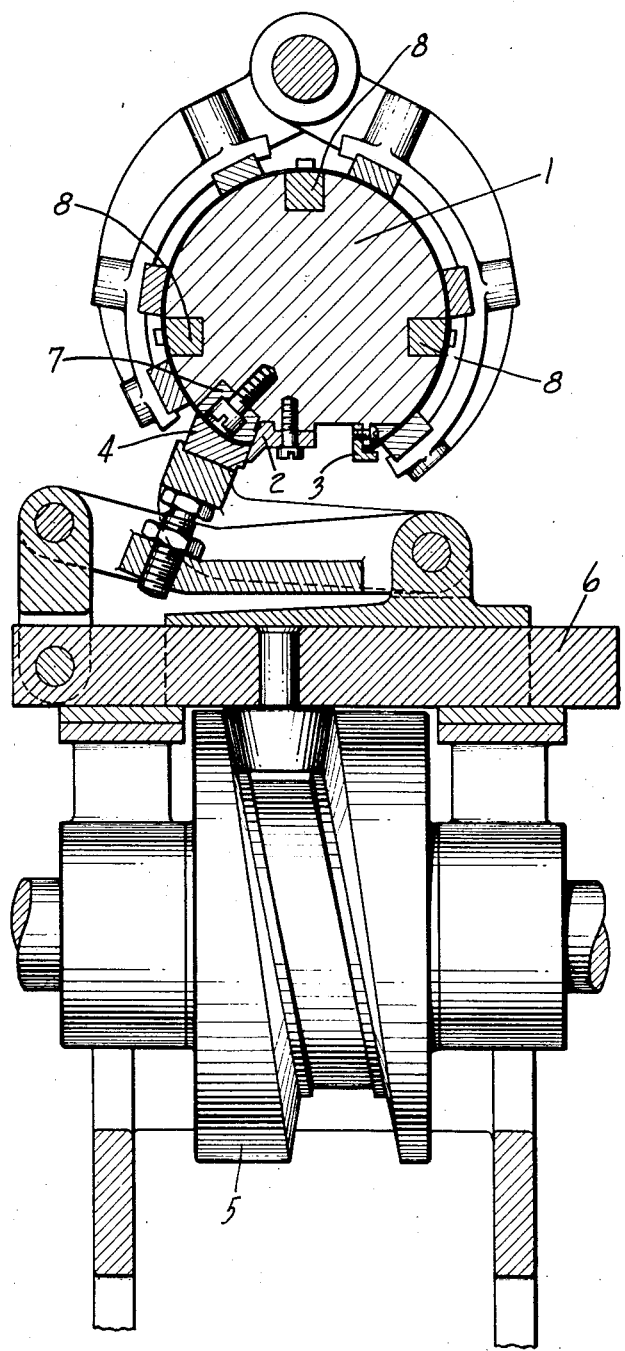

The drawings herewith show only essential principal machine elements embodying the present invention. The handling of the flat body blanks to roll them into tubular shape or circular formation and pass them along the body horn to the various operative stations may be accomplished as shown in the John M. Hothersall United States Letters Patent 2,047,964, issued July 21, 1936, see particularly Figs. 3 and 4, which show blank-feeding and roll-forming mechanism. Such operations take place before the rolled and partially formed body comes into the apparatus of the present invention. In the present apparatus a body is forwarded along a horn 1 (Figs. 1 and 12) the body being advanced in intermittent successive steps to the several operative stations.

Figure 3 illustrates the first operation performed on a partially formed can body according to the present invention. Here the edges of the partially formed body are guided by rail members 2 and 3. While at rest at this station an edge-bending die 4 engages one edge of the body and places a slight inward bend therein. This bending die is operated by a cam 5 which is effective on a slide member 6 which moves the die into and out of bending engagement with a companion die 7 mounted in the body horn. The bending action takes place during a period of rest in the body travel along the horn 1.

The bodies are fed along the horn in successive steps by means of sliding feed bars 8 in the usual manner. These bars are continuous throughout at least a major part of the machine and at each forward stroke feed all of the bodies on the horn from one operative station to the next adjacent station. This type of feed mechanism is well known in can body making machines and does not need special description.

After the edge-bending operation at this station, as shown in Fig. 3, each body passes to a rounding-up station as shown in Figs. 4 and 5. First the body seam edges are separated as shown in Fig. 4 but are later brought together as in Fig. 5.

At this rounding-up station there are two sets or pairs of forming wings or jaws 9 (Fig. 4) and 10 (Fig. 5) which move inwardly against the body and press it firmly against the horn 1. During this movement the edges of the body are pressed against a gauge member 11, which positions its seam margins in proper relation but slightly separated by an upper end 12 of the gauge 11. Following the operation at this station the jaws 9 are first opened. Opening of jaws 10 is delayed, these jaws functioning as holding elements, as will now be described.

As the feed bars 8 start to move the body from the rounding-up station, i. e., from the position of Fig. 5, the wing members 9 open to let the next body enter the station. However, the wing members 10 remain in closed position until the can body is received into the station ahead which is a welding station. As the body passes into the welding station its leading edge is engaged so that the body will not open up. Following this the wings 10 open to permit the next advancing can body to enter fully the rounding-up station.

The wings 9 and 10 (Figs. 4 and 5) of the rounding-up station are supported and actuated so that they move in and out along substantially straight lateral paths. Both sets of wings move in together to properly round up the body and lap its seam edges and both sets of wings are mounted on and are actuated by similar mechanism. Two main supporting shafts for the wings, designated by the numeral 13, are located below and on the sides of the horn 1 and are held stationary in the frame of the machine.

One wing 9 (left as in Fig. 4) is pivotally carried on the upper arm of a three arm rocker member 14 which is mounted on the adjacent shaft 13. The opposite ring 9 is pivotally connected to the upper end of a rocker arm 15 which in turn is mounted on the other shaft 13. The upper outer end of each wing 9 is also pivotally connected to a spacer arm 16 which is mounted on a stationary shaft 17 carried in the frame of the machine. In this manner the wings 9 are supported by the main supporting shafts 13 and the stationary shafts 17.

The rocker member 14 provides the actuating means for the wings 9 and for this purpose one arm of the member may be connected with a lever or like actuating part as shown. Another arm of this rocker member is formed with rack teeth which function as at 18, to impart a corresponding swinging motion to a rocker lever 19 which is mounted loosely on the right hand shaft 13 (Fig. 4), adjacent the rocker arm 15. Rocker arm 15 carries a spring barrel 20 which is adapted to engage a tail part of the rocker lever 19 and to normally hold the arm against a stop carried on the lever.

When the rocker member 14 is moved in a clockwise direction (Fig. 4) the rocker lever 19 is moved in a counterclockwise direction and with it the rocker arm 15. This action swings the two wings 9 inwardly against the can body resting on the horn 1. By reason of the spring connection at 20 between the lever 19 and arm 15, the right side wing is in advance of that on the left and this insures wrapping of the can body around the horn by first seating the seam edge on the right in the slot formed by the gauge end 12 of the gauge 11.

After the right wing 9 has clamped the body on that side of the horn the left wing which is still spaced from the horn moves in further as the spring connection 20 between lever 19 and arm 15 yields and the stop on the lever moves away from the arm. The full movement of the rocker parts 14 and 19 may be predetermined by the adjustment of stop screws 21 which are threaded in the machine frame and which are engaged by lugs formed on these parts.

Wings 10 are mounted in a similar manner being indirectly carried on the shafts 13 and 17. The same kind of a yielding spring connection 20 is used for the rocker arm 15 located on the right side as viewed in Fig. 5. However, its actuating lever, unlike lever 19, for the wing 9, may also be extended beyond the supporting shaft 13 as a straight lever 22 to which actuating power may be applied by means of a lever or other power member.

The left hand wing 10 is pivotally connected at its lower inner section to the upper arm of a bell crank lever 23 which is geared at 18 to the straight lever 22. Otherwise, the wings 10 operate in the same manner as the wings 9 previously described.

At the welding station into which the lapped can body is next advanced there is provided a sizing box, shown in Figs. 6 and 7, which functions as a sizing means for accurately producing the desired outside diameter of each can as it is welded. The inside of the box is bored to the exact outside diameter desired in the finished body and due to its use every body passed through the machine is of like diameter. The body horn 1 where it extends into the welding station is of the internal expanding type indicated at 24 (Fig. 7), the expansion of which forces each body out against the inside surface of the sizing box and holds it there during the welding operation. Figure 6 shows an upper welding electrode 25 and conductor leads 26 which are used for welding.

The lower welding electrodes which are used at this station are best shown in Fig. 12 and are indicated at 27, this part of the circuit being grounded to the frame of the machine. The expanding section 24 remains in expanded position during the welding operation and holds the bodies in fully expanded position until the seam is spot welded. The mechanism carrying the lower welding electrodes may be mounted in the conventional mechanism as shown and which is well known in body making machines and is substantially the same as in the Hothersall patent mentioned.

Figure 12 clearly shows the blank edge gauging devices at 28, and Figures 8 and 9 show details of operation of these gauges. In operation and construction these devices are quite similar to those disclosed in the Peck Patent 1,574,848.

The mechanism is timed to remove the gauges from contact with the body edges before the welding starts to prevent pitting thereof.

Gauges 28 are carried by a slide member 29, which is given vertical reciprociation through a rocker element 30 which engages a lug 31 formed on each gauge. Rocker 30 in turn is operated by a slide member 32 and a pitman 33. This part of the mechanism is timed to gauge the edges of the body blank and the gauges are then removed from contact before the welding current flows. The welding current flows through the positioned can seam as it rests on the body horn and also passes through the electrodes 25 and conductor leads 26 which are connected to a suitable current source, not shown.

In order to keep the spot welding electrodes as cool as possible when not actually welding, a water cooling system is provided. This is shown in Fig. 12. The electrodes 27 are all mounted on the top side of a support member 34 which is substituted for the usual bumping hammer. These electrodes are provided with water passages through which circulating water enters. The water may be brought into the machine by way of a pipe 35 and will discharge by way of a pipe 36 (Fig. 6).

The water flows into the electrodes through suitable passageways, as shown in Fig. 12, and these form part of the circulating system connected with the pipes 35, 36. The water passing through the electrodes 27 thus reduces the heat sufficiently to prevent burning.

As already mentioned, the support member 34 carries the electrodes. The mounting and actuation of the usual bumping hammer mechanism which is here used for carrying the member 34 is well known in the can making art. The numeral 37 (Figs. 6, 8 and 12) designates broadly this mechanism.

Figs. 10 and 11 show the detector device for stopping the machine if a body comes through that has not been spot welded. This is done to prevent damaging the body and to prevent jamming of the machine. For this purpose two arms 38 normally extend down adjacent the outside of the horn with just sufficient space to permit a spot welded body to pass, but close enough to intercept a body that has not been welded and is partially open. When such a condition occurs the arms 38 are engaged and are moved from their normal vertical position, being pressed to the right as in Fig. 11. This action lifts a detector shoe 39 on which the arms are mounted, and swings the shoe on a pivot 40 carried in the frame of the machine. This allows a switch member 41 to slide out of its switch box and stop the machine. After the expanded unwelded body is removed and the arms 38 again replaced in their normal operative position, the machine may be again started.

When the can body has been welded it may be moved off the horn without fear of losing its shape or size. For most containers a hermetically sealed side seam is desirable and therefore it is the usual practice to pass the bodies over soldering devices so that the seam may be fully soldered and sweated. This may be done in the conventional manner.

This is indicated in Fig. 2 which shows the discharge end of the horn 1. It is usual for the can bodies leaving the horn to pass into an outside horn 42 which extends over a solder bath 43 containing molten solder. The solder is brought up on the upper surface of a solder roll 44 which rotates in the solder. Flux may be applied to the welded seam of the can body prior to its reaching the solder roll, the numeral 45 indicating a suitable fluxing device for this purpose.

From the foregoing description it will be observed that flat body blanks rolled into tubular formation at a previous station come into the influence of the reciprocating feed bars whereupon the action of the present machine begins. These bars advance the bodies along the horn to the several operative stations, each body remaining stationary on the horn for a time at each station. The edge bending die and its operative parts perform the first operation following which the bent body is inserted into the fixed sizing box located at the next station. This insures the same outside diameter for each can body.

While so sized the bodies are engaged by the welding devices and the body seam is spot welded to hold the body to an exact outside dimension. To further complete the can body by providing an hermetic side seam, it is merely necessary to flux and solder such welded seam as has already been described.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for making can bodies with welded side seams, comprising means for slightly bending longitudinally a lateral edge of a can body blank to provide one lap of a side seam, means for bringing together said slightly bent lap section and the other lateral edge of said blank into superposed loosely assembled position, means for sizing and holding the can body to a predetermined outside diameter with said side seam lap parts in closely assembled position, the free edge of said bent lap being urged against the other seam lap through the yielding spring action along said longitudinal bend to insure a tight and continuous engagement between said laps, electric welding means for securing the superposed laps together while thus held to form a side seam, and feed means for moving the said can body into welding position adjacent said welding means and for discharging the welded can body after its side seam is welded.

2. A machine for making can bodies with welded side seams, comprising means for slightly bending longitudinally a free edge of a can body blank to provide one lap of a side seam, means for bringing together said bent lap section and the other free edge of said body blank in superposed loosely assembled position, fixed means for sizing each can body to a predetermined outside diameter with said side seam lap parts in closely assembled position, devices for holding said body in said sized closely assembled position, electric welding means for securing the superposed laps together to form the side seam while the body is thus retained in said closely assembled position, the free edge of said bent lap being urged against the other seam lap through the yielding spring action along said longitudinal bend to insure a tight and continuous engagement between said laps, and feeding means for moving said can body into welding position and for discharging the welded can body after its side seam is welded.

3. A machine for making can bodies with welded side seams, comprising a forming horn, feed means for moving can bodies along said horn and through adjacent stations, means at a station for slightly bending longitudinally a lateral edge of a can body blank to provide one lap of a side seam, means at a second station for bringing together said slightly bent lap section and the other lateral edge of said blank into superposed loosely assembled position, means at a third station for sizing and holding the can body to a predetermined outside diameter with side seam parts in closely assembled position, the free edge of said bent lap being urged against the other seam lap through the yielding spring action along said longitudinal bend to insure a tight and continuous engagement between said laps, and electric welding means adjacent said third station for securing the superposed laps of said sized and held can body together to form the side seam.

4. A machine for making can bodies with welded side seams, comprising means for slightly bending longitudinally a lateral edge of a can body blank to provide one lap of a side seam, means for bringing together said slightly bent lap section and the other lateral edge of said blank into superposed loosely assembled position, means for aligning the lap seam parts longitudinally, means including fixed outside die members and expanding inside die members for sizing the can body therebetween to a predetermined diameter with side seam parts in closely assembled position, the free edge of said bent lap being urged against the other seam lap through the yielding spring action along said longitudinal bend to insure a tight and continuous engagement between said laps, electric welding means for securing the aligned superposed laps together while thus held by said dies to form the side seam, and feeding means for moving the said can body into position for said bending, lapping, sizing, aligning and welding operations.

5. A machine for making can bodies with combined electrically welded and soldered side seams, said machine having means for soldering the can body side seams after the welding operation, the combination of means for slightly bending longitudinally a lateral edge of a can body blank to provide one lap of a side seam, means for bringing together said slightly bent lap section and the other lateral edge of said blank into superposed loosely assembled position, means for sizing the can body to a predetermined outside diameter with side seam parts in closely assembled position, the free edge of said bent lap being urged against the other seam lap through a yielding spring action along said longitudinal bend to insure a tight and continuous engagement between said laps, means for holding the sized body for the welding operation, electric welding means for securing the superposed laps together while thus held to form the side seam, and feed means for moving the said can body into successive operative positions relative to said bending, assembling and welding means and for discharging the completed body from said machine.

6. A machine for making can bodies with combined electrically welded and soldered side seams, said machine having means for soldering the can body side seams after the welding operation, the combination of die means for slightly bending longitudinally a lateral edge of a can body blank to provide one lap of a side seam, contracting members for bringing together said slightly bent lap section and the other lateral edge of said blank into superposed loosely assembled position, means for aligning the lap seam parts longitudinally, fixed means including outside die members for sizing each can body to a predetermined outside diameter with side seam parts in closely assembled position, the free edge of said bent lap being urged against the other seam lap through a yielding spring action along said longitudinal bend to insure a tight and continuous engagement between said laps, electric welding means for securing the thus aligned superposed laps together to form the side seam, and feeding means for advancing said can body into successive positions for said bending, lapping, sizing, aligning and welding operations.

7. A machine for making can bodies with combined electrically welded and soldered side seams, said machine having means for soldering the can body side seams after the welding operation, the combination of a forming horn extending through a plurality of operating stations, feeding means for intermittently advancing the bodies along said horn so that each body remains at rest at each station for an operation, means at a said station for slightly bending longitudinally a lateral edge of the can body to provide one lap of the side seam, means at a succeeding station including two sets of clamping wings for bringing together said slightly bent lap section and the other lateral edge of said blank into superposed loosely assembled postion, fixed die means at a further succeeding station for receiving a can body while still held in lapped position by one set of said clamping wings, expanding elements located in said horn at said station for sizing each can body to a predetermined outside diameter with side seam parts in closely assembled position by forcing the same into said fixed die means, the free edge of said bent lap being urged against the other seam lap through a yielding spring action along said longitudinal bend to insure a tight and continuous engagement between said laps, means at said last mentioned station for aligning said lap seam parts longitudinally, and electric welding means also located at said last mentioned station for securing the superposed laps together to form the welded side seam.

8. A machine for making can bodies with welded side seams, comprising means for slightly bending longitudinally a lateral edge of a can body to provide one lap of a side seam, means for bringing together said slightly bent lap section and the other lateral edge of said blank into superposed loosely assembled position, means for sizing the can body to a predetermined outside diameter with side seam parts in closely assembled position, the free edge of said bent lap being urged against the other seam lap through the yielding spring action along said longitudinal bend to insure a tight and continuous engagement between said laps, electric welding means for securing the superposed laps together to form the side seam, feeding means for moving the can body into operative position relative to each of said means successively and for discharging the welded body from said machine, and means for detecting an unwelded body and thereupon interrupting said feeding means.

9. A machine for making can bodies with combined electrically welded and soldered side seams, said machine having means for soldering the can body side seams after the welding operation, the combination of a forming horn along which the can bodies are advanced through successive operations, means for feeding the can bodies intermittently along said horn and into adjacent operating stations, means at a said station for slightly bending longitudinally a lateral edge of a can body to provide one lap of a side seam, contracting members at a said station for bringing together said slightly bent lap section and the other lateral edge of said blank into superposed loosely assembled position, fixed means at a said station including outside die members for sizing each can body to a predetermined outside diameter with side seam parts in a closely assembled position, the free edge of said bent lap being urged against the other seam lap through a yielding spring action along said longitudinal bend to insure a tight and continuous engagement between said laps, electric welding means at a said station for securing the superposed laps together while thus sized and closely assembled to form the welded side seam, and means located in the path of the advancing can bodies for detecting the welded condition of a can body and for stopping the machine when an improperly welded can body is detected.

10. A can body welding machine comprising means for longitudinally bending a lap seam margin of a body blank, means for aligning and holding together said bent margin and the opposite margin of said blank in overlapping positions, the free edge of said bent margin being directed toward and urged by said holding means and through the yielding spring action along said longitudinal bend against the opposite margin, and means for welding said overlapped margins together while thus held.

11. A can body welding machine comprising means for feeding can bodies progressively through said machine along a predetermined path, means for retaining each body in sized and aligned position with seam portions overlapping, welding means for securing together said seam portions while said body is thus held by said retaining means, a detector adjacent the path of said bodies and adapted to engage only those bodies that have sprung open due to improper welding, and means operatively uniting said detector and said feeding means to stop said feeding means upon engagement of said detector with a said improperly welded can.

WILLIAM P. WINTERS.